May 24, 1960  G. E. PLATZER, JR., ET AL  2,938,143
VEHICLE LIGHTING DEVICE

Filed Aug. 1, 1958   3 Sheets-Sheet 1

INVENTORS
George E. Platzer, Jr.
Leonard P. Gau.
BY
Harness and Harris
ATTORNEYS

| CELL | SENS. RELAY | FOOT SWITCH | P. RELAY | BEAMS |
|---|---|---|---|---|
| Dark | Off | Auto. | On | Upper |

| CELL | SENS. RELAY | FOOT SWITCH | P. RELAY | BEAMS |
|---|---|---|---|---|
| Lit | On | Auto. | Off | Lower |

INVENTORS.
George E. Platzer, Jr.
Leonard P. Gau.
BY
Harness and Harris
ATTORNEYS.

| CELL | SENS. RELAY | FOOT SWITCH | F. RELAY | BEAMS |
|------|-------------|-------------|----------|-------|
| Dark | Off | Manual | Off | Lower |

| CELL | SENS. RELAY | FOOT SWITCH | F. RELAY | BEAMS |
|------|-------------|-------------|----------|-------|
| Lit | On | Manual | On | Upper |

INVENTORS
George E. Platzer, Jr.
Leonard P. Gau
BY
Harness and Harris
ATTORNEYS.

United States Patent Office 2,938,143
Patented May 24, 1960

2,938,143

VEHICLE LIGHTING DEVICE

George E. Platzer, Jr., and Leonard P. Gau, Birmingham, Mich., assignors to Chrysler Corporation, Highland Park, Mich., a corporation of Delaware Filed Aug. 1, 1958, Ser. No. 752,601

14 Claims. (Cl. 315—83)

The present invention relates to vehicle lighting systems and has particular reference to a new and improved automatic headlamp dimming device.

In the past drivers of vehicles have been obliged to manually dim or brighten their headlamps depending upon the relative amount of light in front of the vehicle. Some mechanisms have been devised to automatically regulate these headlamps. These mechanisms, however, have been bulky, complicated, and expensive. A principal object of our invention, therefore, is to provide an improved automatic headlamp dimming device which is extremely compact and capable of being easily installed.

Another principal object of our invention is to provide an improved device of the type described which contains a small number of parts and is relatively inexpensive compared to others known in the art.

A further object of our invention is to provide an improved automatic headlamp dimmer which cooperates with the conventional manually operable dimming switch to the extent that the automatic device is "locked in" whichever position it is in when the manual switch is activated.

More specifically, our invention relates to an improved automatic headlamp switching device incorporating a photoelectric cell which controls the amount of plate current of a vacuum tube in relationship to the amount of light reaching the cell. The device also includes a sensitive relay in the plate circuit of the tube. This relay controls the operation of a power relay, the latter having contacts which selectively energize either the upper or lower beams of the headlamps. The entire device operates at the battery potential of the vehicle and further is provided with a pair of diodes which facilitate the aforementioned "locked in" feature of the device when the manual foot switch is activated.

Other objects and advantages of our invention will become evident from the following description taken in conjunction with the accompanying drawings, in which.

Figure 6:
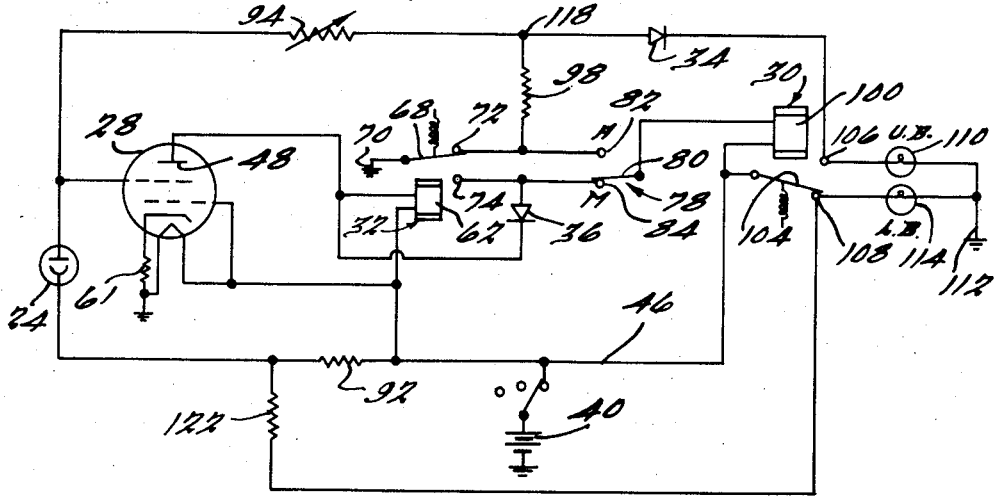
Figure 7:
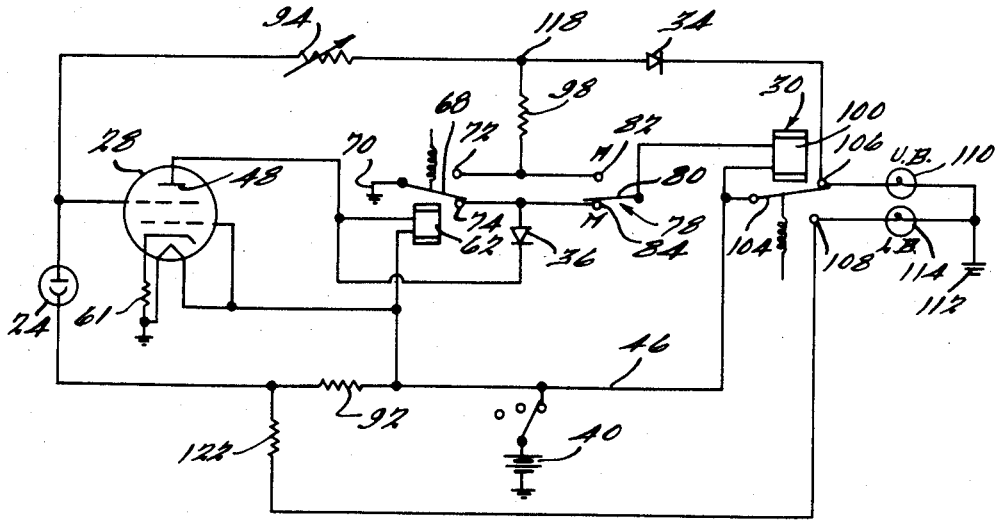

Figure 6 is a schematic diagram of the invention illustrating the condition where the cell is dark, the sensitive relay is de-energized, the foot switch is in manual position, the power relay is de-energized, and the lower beams are energized; and Figure 7 is a schematic diagram of the invention illustrating the condition where the cell is lit, the sensitive relay is energized, the foot switch is in manual position, the power relay is energized, and the upper beams are energized.

Figure 1:
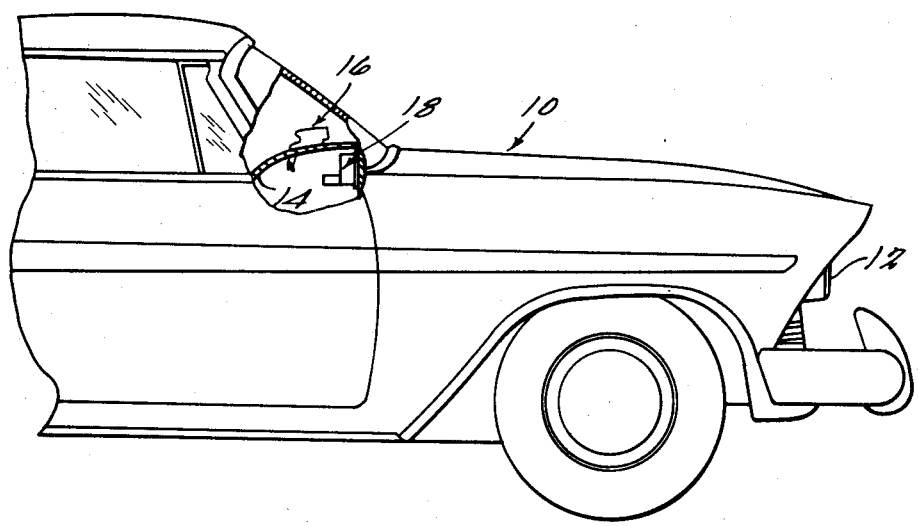
Figure 1 is a partial view of a vehicle having a section broken away illustrating a typical installation of our device.

Referring now to the drawings and particularly Figure 1, we have shown a partial view of an automobile 10 having headlamps, one of which is shown at 12, and an instrument panel 14. Mounted on top of the instrument panel 14 is a head 16 which is positioned to receive light shining on the front of the automobile. Mounted beneath the instrument panel is a control device 18. Figure 1 is shown in a simplified form and it will be understood that there is a cable connecting the control device 18 with the headlamps, the head 16, and a conventional foot switch. The cable and the foot switch are not shown for the purpose of simplicity.

Figure 2:
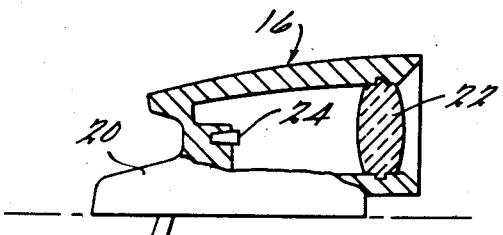
Figure 2 is an enlarged view of the control head shown within the circle 2 having a portion broken away to more clearly show the device.

In Figure 2 we have shown a partial sectional view of the head 16 which comprises a housing 20, a lens 22, and a photoelectric cell 24 positioned within the housing for receiving light which is projected through the lens 22. The lens 22 is designed to receive light at predetermined angles both transversely and from an upper to a lower limit so that stray light which is normally encountered when driving a vehicle does not affect the dimming device.

Figure 3:
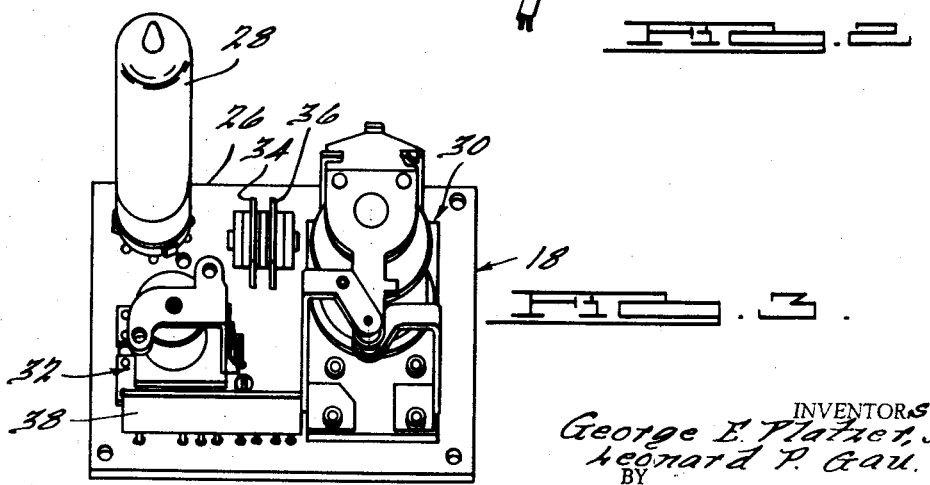
Figure 3 is a perspective view of the control mechanism within the box shown in Figure 1, wherein the cover is removed to show the compact placement of the parts therein.

In Figure 3 we have shown a perspective view of the internal parts of a control device 18. This Figure 3 is included in the drawings to illustrate the compact arrangement of a relatively few number of parts. The numeral 26 is a printed circuit board on which is mounted an electronic valve or vacuum tube 28, a power relay 30, a sensitive relay 32, first and second diodes or selenium rectifiers 34 and 36, and a resistor wafer 38. All of the resistances present in our circuit are preformed in the wafer 38.

Figure 4:
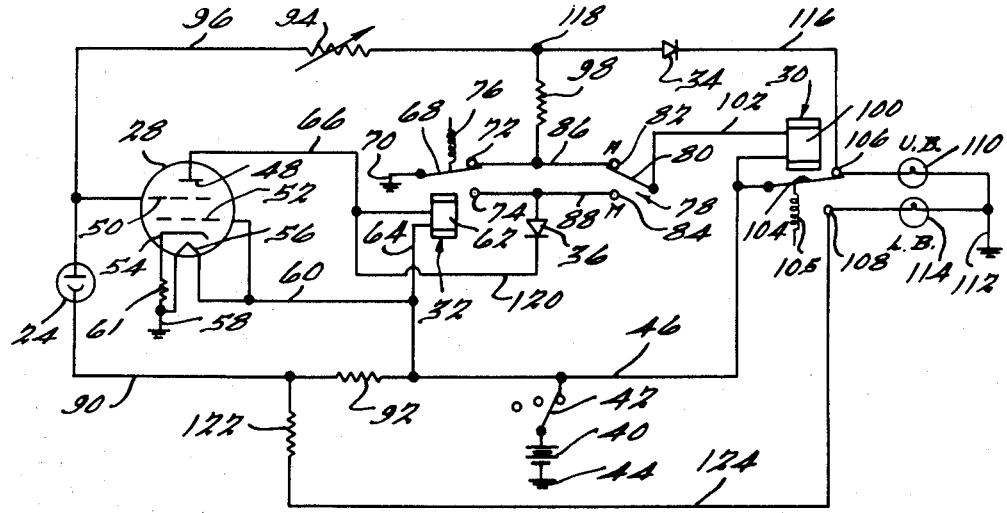
Figure 4 is a schematic diagram of the invention illustrating the condition where the photoelectric cell is dark, the sensitive relay is de-energized, the foot switch is in automatic position, the power relay is energized, and the upper beams or headlamps are energized.
Figure 4:
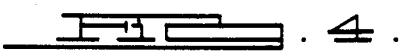

Reference is now made to schematic diagrams of our improved device which are shown in Figures 4 through 7. In view of the fact that all of the schematic diagrams as shown in these figures are the same, with the exception of the switching arrangement, attention is more specifically invited to Figure 4 for a general description of the device. It should also be noted that only the relatively long lines have been numbered as conductors. The shorter connecting lines have not been numbered so that the figures will not be cluttered with numbers. The numeral 40 represents a conventional vehicle battery which, for the purpose of illustration, may be considered the 12-volt variety. One side of the battery 40 is connected to a conventional headlamp switch 42, while the other side of the battery is grounded at 44. The ground connection at 44 as well as every other ground connection shown in the diagrams may be considered a common terminal in view of the fact that all ground connections by their nature are common. The switch 42 is connected as shown in Figure 4 in its headlight "on" position and is connected to a 12-volt bus 46. The 12-volt bus 46 may be considered as the high voltage line in the entire circuit. The 12-volt bus 46 may also be considered as the power terminal of the entire circuit. The vacuum tube 28 comprises a plate 48, a control grid 50, an accelerating grid 52, a cathode 54, and a filament 56. One side of the filament 56 is grounded at 58, while the other side of the filament is connected along with the accelerating grid 52 through the connector 60 to the 12-volt bus 46. A cathode biasing resistor 61 is connected between the cathode 54 and ground at 58.

The sensitive relay 32 is provided with a coil 62, one side of which is connected through connector 64 to the 12-volt bus 46, while the other side is connected through connector 66 to the plate 48 of the tube. The sensitive relay 32 is provided with a single pole double throw switch which includes a movable contact 68 which is grounded at 70, a fixed contact 72 and a fixed contact 74. The movable contact 68 is urged by an appropriate spring as shown at 76 into the position as shown in Figure 4 which opposes the movement of the movable contact 68 under the influence of the magnetic flux generated by the coil 62 in conventional relay fashion. A conventional single pole double throw foot switch shown at 78 is provided with a movable contact 80 and fixed contacts 82 and 84. It will be noted that fixed contact 82 has a letter A adjacent thereto which indicates the automatic position, while fixed contact 84 has a letter M adjacent thereto indicating the manual position of the foot switch. Fixed contact 72 of the sensitive relay is connected by connector 86 to fixed contact 82 of the foot switch, while fixed contact 74 of the sensitive relay is connected by connector 88 to fixed contact 84 of the foot switch.

A photocell 24 has one side connected to the control grid 50 of the vacuum tube while the other side is connected through connector 90 to one side of resistor 92. The other side of the resistor 92 is connected to the 12-volt bus 46. A variable grid resistor 94 has one side connected through connector 96 to the control grid 50 of the tube, while the other side is connected to one side of another grid resistor 98. The other side of the resistor 98 is connected to the connector 86 which extends between the fixed contacts of the sensitive relay and the foot switch. The power relay 30 is provided with a coil 100 which has one side connected through connector 102 to the movable contact 80 of the foot switch while the other side of the coil is connected to the 12-volt bus 46. The power relay 30 is provided with a single pole double throw switch in the form of movable contact 104 and fixed contacts 106 and 108. The fixed contact 106 is connected to one side of the upper beams indicated at 110, while the other sides of the upper beams are grounded at 112. The fixed contact 108 is connected to one side of the lower beams 114, while the other sides of the lower beams are also grounded to the ground 112. The movable contact 104 is connected to the 12-volt bus 46. It will be noted that the movable contact 104 is urged by spring 105 in the direction toward the fixed contact 108, although this spring is not of sufficient strength to overcome the magnetic force of the coil 100 of the power relay which urges the movable contact 104 to contact the fixed contact 106 when the coil is energized. The diode 34 has one side connected by connector 116 to the fixed contact 106 of the power relay, while the other side of the diode 34 is connected at 118 to the juncture of the resistors 98 and 94. The diode 36 has one side connected to the connector 88, while its other side is connected through connector 120 to the connector 66 which connects one side of the coil of the sensitive relay and the plate 48 of the tube. The polarity of the diodes 34 and 36 and the importance thereof will be hereinafter set forth when the operation of the device is explained. The resistor 122 has one side connected through connector 124 to the fixed contact 108 of the power relay, while the other side of the resistor is connected to connector 90, the latter connecting one side of the photoelectric cell with one side of the resistor 92.

*Operation*

We shall now set forth the operation of our improved device, and it should be borne in mind that various values will be discussed for the various components in our improved circuit and such are given for the purpose of illustration. It will be readily understood that these values could be changed, relatively speaking, and still arrive at substantially the same operation. For purposes of illustration, let us assume that an automobile employing our device is driving down a highway at night and there are no cars approaching. We will now set forth the operating conditions of our improved electronic dimming device under these conditions. The accelerating grid 52, as previously set forth, is connected to the 12-volt bus 46. The cathode 54 of the tube is connected to ground through the cathode bias resistor 61. As a result, there is an electron flow from the cathode to the accelerating grid thereby causing a voltage drop across the cathode biasing resistor 61 to form a bias on the tube which, all other things being equal, is sufficient to make plate circuit of the tube substantially non-conductive. In the device which has been built, the resistor 61 was 56 ohms and with the 12 volts applied to the accelerating grid 52 a bias voltage of 4 volts was developed across the resistor 61. To illustrate that the 4 volts developed across the bias resistor 61 was sufficient to maintain the tube at a substantially ineffective conducting state relative to the plate 48, let us look at the effect of the photoelectric cell 24 under the condition where no light is striking it. The photoelectric cell 24 is the type that has an extremely high resistance under no light conditions and a relatively lower resistance when light strikes it. It will be seen that the photoelectric cell 24 is connected in a circuit which includes the resistor 92 and the grid resistors 94 and 98. In this last mentioned circuit the current flows from the 12-volt bus 46 through the resistor 92, the bias cell 24, the grid resistor 94, the grid resistor 98, and to ground 70 through contacts 72 and 68 of the sensitive relay. Under normal operating conditions a value of 100 to 300 megohms is suitable for the photoelectric cell under no light conditions. In the construction completed by applicants, a value of approximately 25 megohms was assigned to the variable resistor 94, and a value of approximately 560 ohms was assigned to the resistor 98, the purpose of the latter to be hereinafter set forth. It will also be seen that in order for the tube 28 to conduct from cathode to plate, the bias voltage which has been developed across the bias resistor 61 must be cancelled to an extent where there will be conduction between the cathode and the plate. This cancelling voltage must be developed across the resistors 94 and 98. Under no light conditions, however, the resistance of the photocell is so high that substantially all of the voltage in the circuit is dropped across the photoelectric cell 24 and not the grid resistors 94 and 98, therefore there is substantially no blocking or bucking voltage developed across these last named resistors to cancel any or part of the bias resistance dropped across the cathode bias resistor 61. It should also be noted that resistor 122 which is connected between the resistor 92 and the photocell 24 at one side, and to ground 112 through stationary contact 108 and the low beams on the other side of resistor 122, forms a voltage divider circuit. As a result, if resistances 92 and 122 are substantially equal, only a half of the voltage from the 12-volt bus 46 is applied to the grid circuit. It will be seen, therefore, that under no light conditions the resistance of the photocell 24 is so high that there is not sufficient voltage developed across the grid resistors 94 and 98 to affect the bias on the tube to cause any substantial conduction between the cathode 54 and the plate 48. Practically speaking the resistor 94, since it has a high resistance compared to resistor 98, is the one that drops the voltage in the grid circuit. Since there is not enough conduction in the tube relative to the plate circuit of the tube there will be very little current flowing through the coil 62 of the sensitive relay which is a part of the plate circuit of the tube. In practice it was found that for the particular sensitive relay used in conjunction with the tube used that approximately 8 mils in the plate circuit was required to energize the sensitive relay. Since the sensitive relay is not energized the relay contacts are oriented in the position as shown in Figure 4 thereby causing the power relay 30 to be in an energized condition. This energized condition will be readily seen since the coil 100 of the power relay 30 is connected from the 12-volt bus on one side and through the foot switch 78 in its automatic position through the connector 86 to ground 70 by way of the contacts 68 and 72 of the sensitive relay on the other side. When the relay is energized the movable contact 104 of the relay is engaged between the contact 106 and the 12-volt bus 46 thereby energizing the high beams 110, the latter being connected between the 12-volt bus and ground at 112. At this point a partial explanation of the function of the diodes 34 and 36 is believed to be in order. It will be noted that during the conditions as set forth in Figure 4, the diode 36 is not connected in the circuit in view of the fact that fixed contacts 74 and 84 are not connected. The diode 34, however, does have current flowing therethrough. The diodes 34 and 36 are connected in such a way to greatly enhance the novelty of the circuit. As is known, diodes of this type have what is commonly referred to as forward resistance and back resistance. In other words, when current flows, for example, from point 118 through diode 34 to contact 106 of the power relay the forward resistance of the diode is approximately 50 ohms. However, if the current flows in the opposite direction through the diode 34, the back resistance thereof is approximately 10,000 ohms. It will be understood, of course, that other diodes of different ohm values are available, but what is important is the relative difference between the forward and back resistances thereof. It will be seen in Figure 4 that there is current flowing from the 12-volt bus through the movable contact 104 of the power relay through the diode 34, the resistor 98, to ground 70. Under these conditions there will be very little effect on the grid circuit in view of the fact that most of the voltage through the last mentioned circuit will be dropped across the diode 34 because of its high resistance compared to the 500 or so ohms contained in the resistor 98. To summarize, therefore, under no light conditions the various components remain as they are shown in Figure 4 and the upper beams are lit. It should be noted, however, that the variable resistor 94 is made variable to accommodate for the tolerances in the different types of photoelectric cells that are available on the market today.

Now let us assume that as we drive along the highway another car approaches thereby causing light to strike the photocell 24. Attention is now invited to Figure 5. As the light intensity that strikes the photocell 24 increases, the internal resistance of the photocell decreases, thereby causing less voltage to be developed or dropped across the photocell and more voltage to be dropped across the variable resistor 94 and the resistor 98. As more and more voltage is dropped across the grid resistors 94 and 98, more and more voltage is produced to buck the bias voltage developed across the cathode bias resistor 61. As this bucking action increases, the plate current between the cathode and front of the vacuum tube increases until it reaches a predetermined value. In actual practice the value is approximately 8 mils as heretofore stated. When the plate current reaches this aforementioned value the relay is energized and the movable contact 68 of the relay shifts from contact 72 to contact 74. Momentarily at this time it will be seen also that the ground connection for the coil 100 of the power relay 30 is broken thereby de-energizing the relay 30 causing the movable contact 104 of the power relay to shift from stationary contact 106 to stationary contact 108. This, of course, means that the power is shifted from the upper beams 110 to the lower beams 114. During this transmission from the automatic high beams to the automatic low beams in response to light striking the photocell 24, it should be pointed out that three functions occur in the circuit which may not be readily seeable. Firstly, it will be seen that once the movable contact 68 leaves the fixed contact 72, the ground connection for the grid resistors is also broken thereby removing the bucking voltage developed across the grid resistors. Ordinarily, the removal of the ground connection in the grid circuit which consequently removes the bucking voltage would reduce the conduction of the tube to de-energize the relay 62. However, at this moment when the movable contact 68 of the sensitive relay is moving from one position to another and the ground connection is broken, the movable contact 104 of the power relay is still in the position as shown in Figure 4 thereby causing a direct 12-volt charge to be placed on the grid 50 of the tube. This 12-volt charge enhances the completion of the movement of the movable contact of the sensitive relay thereby completing its cycle. Secondly, it will be seen that once the movable contact 104 of the power relay is moved from contact 106 to 108, in view of the fact that the coil 100 of the power relay has been de-energized, the 12-volt charge is removed from the control grid 50 of the tube. At this time, however, it will be seen that there is a circuit path between the 12-volt bus 46 through the relay coil 100, the resistor 98, the diode 34 to ground 112 through the upper beams 110. In view of the fact that the resistance of the resistor 98 is approximately 500 to 600 ohms and the forward resistance of the diode 34 is approximately 50 ohms. it will be seen that substantially all of the voltage is dropped across the resistor 98 thereby placing the point 118 at substantial ground potential. This will be seen since in actual practice approximately .8 volts are dropped across the diode 34 during this operation. In view of the fact that the point 118 is at substantial ground potential, the resistor 94 again develops the bucking voltage to maintain the tube 28 in its conducting condition. Thirdly, when the movable contact 68 of the sensitive relay moves to contact the stationary contact 74, the diode 36 is grounded. It will be seen, however, that the grounding of the diode has little effect on the circuit in view of the fact that any current therethrough would first go through the coil 62 of the sensitive relay and then through the diode 36 to ground. This direction of current through the diode is opposed by the back resistance of the diode which is quite high and therefore this condition is relatively ineffective on the plate circuit of the tube.

In summary, therefore, it will be seen that when sufficient light strikes the photocell 24, the tube 28 conducts in its plate circuit thereby energizing the sensitive relay which has a movable contact that disconnects the ground circuit of the power relay, thereby causing the movable contact of the power relay to switch from the upper beams to the lower beams. At this point the function of the resistor 122 should be noted. As heretofore stated, when the upper beams are energized the resistor 122 is grounded at 112 through the lower beams thereby causing a voltage divider circuit to present only a percentage of the voltage to the grid circuit of the tube. However, when the ground at 112 for the resistor 122 is removed when the movable contact of the power relay is switched to lower beam position, the voltage divider circuit is no longer present and the full voltage is applied through the photocell 24 to the grid resistors 94 and 98. This in effect makes the grid circuit more sensitive in the lower beam position. This is particularly helpful when the vehicle is driving down the road and meets an oncoming vehicle which has its upper beams on. In response to the upper beams the automatic operation of applicants' device switches applicants' beams from upper to lower. Under most conditions this action would cause the driver of the oncoming vehicle to switch his beams from upper to lower. As a result we would not want the condition where the change from the upper to lower beam of the oncoming vehicle would remove a sufficient amount of light from the photocell to de-energize the sensitive relay. As a result, when the beams are moved to the low beam position the grid circuit of the tube becomes more sensitive in view of the additional voltage thereby making the grid circuit sensitive enough to maintain the tube in conduction even though lower light is presented by the oncoming vehicle's removal to the lower light position. When the light is removed from the photocell 24 the circuit returns in reverse direction and under reverse operating conditions to the condition set forth in Figure 4.

Figure 5:
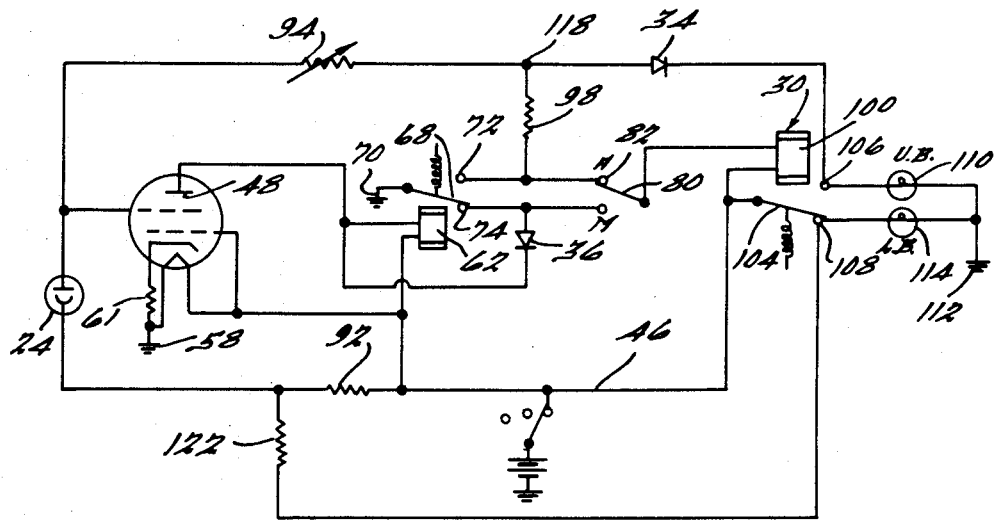
Figure 5 is a schematic diagram of the invention illustrating the condition where the cell is lit, the sensitive relay is energized, the foot switch is in automatic position, the power relay is de-energized, and the lower beams are energized.
Figure 5:

Now let us assume that the headlamps are in upper beam position as shown in Figure 4 under no light conditions and the operator of the vehicle desires to shift to manual operating conditions to thereby change the headlamps from upper beams to lower beams. Attention is now invited to Figure 6 which shows that the movable contact 80 of the foot switch 78 has been moved from the automatic fixed contact 82 to the manual fixed contact 84. Under these conditions it will be noted that the ground circuit for the coil 110 of the power relay has been broken thereby de-energizing the coil sufficiently to cause the movable contact 104 of the power relay to switch from upper beams to lower beams. Once again this operation has happened under no light conditions and it is particularly desirable that in view of the fact that the operator has chosen manual operation that the automatic features of applicants' device be discontinued. It will be noted that if during this time light strikes the photocell 24 causing energization of the relay coil 62, the movable contact 68 will move from contact 72 to contact 74 there again re-completing the ground circuit of the power relay coil and switching the beams back to the upper beam position. This condition is prevented by the utilization of the diode 36. It will be noted that when the movable contact 80 of the foot switch is in its manual position as shown in Figure 6 that this throws the coil 100 of the power relay in parallel with the coil 62 of the sensitive relay wherein both coils are in the plate circuit of the tube 28. In view of the fact that the resistance of the power relay is approximately one-tenth of that of the coil 62 of the sensitive relay, irrespective of how much light strikes the photocell 24 causing the plate current to flow, most of the plate current will flow in the power relay coil and not in the sensitive relay coil. As a result, under these conditions there will never be sufficient current flowing through the coil 62 of the sensitive relay to energize the sensitive relay. Therefore, when the foot switch is in its manual position and the headlamps are switched from upper beam to lower beam this condition will remain permanent because of the fact that the sensitive relay has become inoperative no matter how much light strikes the photocell. When the operator of the vehicle moves the foot switch so that the movable contact moves back to contact 82 or the automatic position the condition as shown in Figure 4 resumes and the headlamps are once again be-switched from the lower beams to the upper beams and the automatic operation is once more in effect. The reason why the power relay coil is so conveniently inserted in parallel with the sensitive relay coil is because of the fact that the current flows through the diode 36 developing only a small voltage drop thereacross since the current is flowing through this diode in its forward direction where the forward resistance is approximately 50 ohms. In the actual model built the resistance of the power relay coil 100 was approximately 50 ohms while the resistance of the coil 62 of the sensitive relay was approximately 500 ohms. In the event that there is light striking the photocell 24 when the operator of the vehicle moves the foot switch from the position shown in Figure 6 back to its positon shown in Figure 4 the circuit will automatically take the relative switch positions as shown in Figure 5. This action will be so fast that the low beams will remain on low beams and will not return to the upper beams.

Now let us assume that the circuit is in the "light" conditions as shown in Figure 5 and it is the desire of the operator of the vehicle to switch from lower beams to upper beams manually by the use of the foot switch. Reference is now made to Figure 7 where this condition is shown. When the movable contact 80 of the foot switch is moved to its manual position it will be noted that the ground circuit of the coil 100 of the power relay 30 is once again completed causing energization of this coil and consequent movement of the movable contact 104 from the lower beam to the upper beam position. The condition now exists where there is light striking this photocell but the beams are in upper beam position and it is desired to maintain this manual operation and to keep the beams in the upper beam position. It will be seen that if the light which has been hitting the photocell 24 is removed under normal conditions the sensitive relay 32 will be de-energized thereby moving its movable contact from contact 74 to 72 to break the ground circuit of the power relay coil 100 and again switch from upper to lower beams. This condition is prevented by the use of the diode 34 which as heretofore stated completes the circuit that places a 12-volt or battery charge directly through the diode 34, the resistor 94 to the control grid 50 of the tube. It will be seen, therefore, that under these conditions, with the charge on the grid, that the plate current will continue thereby holding the movable contact of the sensitive relay down at all times while the foot switch is in the manual position as shown in Figure 7. By actuating the foot switch once again, the device is returned to automatic operation.

By employing our improved device it will be appreciated that the driver of the vehicle enjoys true automatic or manual operation of his headlamps. While we have shown and described only one embodiment of our invention, it will be understood that certain changes may be made without departing from the spirit of the invention or the scope of the claims appended hereto.

We claim:

1. In a vehicle having a source of electrical energy provided with a power terminal and a common terminal and having headlamp means provided with upper beam filaments and lower beam filaments wherein each of said filaments has a connection to said common terminal; a device for effecting automatic selective energization of said headlamp filaments comprising a vacuum tube including a filament, a cathode, a grid and a plate, means connecting said filament to said power and common terminals to effect energization thereof, means biasing said cathode relative to said common terminal, circuit means operatively connecting the plate of said tube to said power terminal, a relay having a coil and a contact movable between first and second fixed contacts, means urging said movable contact into engagement with said second fixed contact when said coil is de-energized, circuit means operatively connecting the coil of said relay to said terminals wherein the energization and de-energization of said coil is predetermined by the amount of current flowing in the plate circuit of said tube, means adapted to connect said first fixed contact of said relay to said upper beam filaments and said second fixed contact of said relay to said lower beam filaments, energization of said relay coil accommodating the engagement of the movable contact and the first fixed contact of said relay to effect energization of said upper beam filaments, a first resistor having one side connected to said power terminal, a light sensitive device connected between the other side of said first resistor and the grid of said tube, a second resistor connected between said other side of said first resistor and the second fixed contact of said relay to thereby provide a voltage divider circuit when said lower beam filaments are de-energized, and a grid resistor operatively connected between the grid of said tube and said common terminal thereby accommodating a circuit from said first terminal through said first resistor, said light sensitive device and said grid resistor to said common terminal, said light sensitive device being predetermined to have a relatively high resistance under small light conditions and to have progressively less resistance as the light striking it increases in intensity, said last mentioned completed circuit providing a predetermined voltage drop across said grid resistor in response to a predetermined resistance value of said light sensitive device thereby causing a predetermined amount of plate current to flow in said tube.

2. The subject matter of claim 1 including a rectifier having a high resistance and a low resistance depending upon the direction of current flow therethrough, said rectifier being connected between said grid resistor and the first fixed contact of said second relay and having its polarity predetermined to provide a low resistance path from said grid resistor to said common terminal through said upper beam filaments when the latter are de-energized.

3. In a vehicle having a source of electrical energy provided with a power terminal and a common terminal and having headlamp means provided with upper beam filaments and lower beam filaments wherein each of said filaments has a connection to said common terminal; a device for effecting automatic selective energization of said headlamp filaments comprising a vacuum tube having a plate circuit and a grid circuit, means connecting said tube to said terminals to effect energization thereof, a first relay having a coil and a contact movable between first and second fixed contacts, means urging said movable contact into engagement with said first fixed contact when said coil is de-energized, means connecting the coil of said first relay in said plate circuit, means connecting said movable contact to said common terminal, a manually operable switch having a contact movable between an automatic position contact and a manual position contact, means connecting said automatic position contact with the first contact of said first relay, means connecting said manual position contact with the second contact of said first relay, a second relay having a coil and a contact movable between first and second fixed contacts, means urging said last mentioned movable contact into engagement with said last mentioned second fixed contact when said second relay coil is de-energized, means connecting said last mentioned movable contact to said power terminal, means adapted to connect said first fixed contact of said second relay to said upper beam filaments and said second fixed contact of said second relay to said lower beam filaments, means connecting the coil of said second relay between said power terminal and the movable contact of said manually operable switch thereby causing energization of said second relay coil when the movable contact of said manually operable switch engages the automatic position contact and the movable contact of said first relay engages the first fixed contact thereof, energization of said second relay coil accommodating the engagement of the movable contact and the first fixed contact of said second relay to effect energization of said upper beam filaments, a light sensitive device connected in said grid circuit, grid resistor means connected in said grid circuit, said light sensitive device being predetermined to have a relatively high resistance under small light conditions and to have progressively less resistance as the light striking it increases in intensity, said grid circuit providing a predetermined voltage drop across said grid resistor means in response to a predetermined resistance value of said light sensitive device thereby causing a predetermined amount of plate current to flow in said plate circuit, the coil of said first relay being constructed to move the movable contact to said second fixed contact of said first relay when said plate current passing through the coil of said first relay reaches said predetermined amount, said last mentioned movement of said movable contact of said first relay breaking the circuit and de-energizing the coil of said second relay thereby causing movement of the movable contact of said second relay from said first fixed contact to said second fixed contact to de-energize said upper beam filaments and energize said lower beam filaments, and means connected between said grid circuit and the first fixed contact of said second relay and providing a low resistance path from said grid resistance means to said common terminal through said upper beam filaments when the latter are de-energized.

4. The subject matter of claim 3 including additional means connected between said plate circuit and the manual position contact of said manually operable switch for effecting a parallel connection of the coils of said first and second relays when the movable contact of said manually operable switch engages the manual position contact thereof.

5. In combination with a mechanism having an electrical power source provided with a power terminal and a common terminal and first and second electrical members each having a connection to said common terminal, an automatic control device adapted to selectively energize said first and second electrical members, comprising a vacuum tube having a plate, a grid and means for accommodating the flow of current through said tube, means connecting said tube with said terminals for energizing said tube, circuit means interconnecting the plate of said tube with said power terminal and with said members to accommodate selective energization of said members in response to the amount of plate current flowing through said tube, a light sensitive device connected between said power terminal and said grid, a resistor connected between said grid and said common terminal, and a diode having a high resistance and a low resistance depending upon the direction of current flow therethrough, said diode being connected between said resistor and one of said electrical members and having its polarity predetermined to provide a low resistance path from said resistor to said common terminal through said last mentioned electrical member when the latter is de-energized.

6. In combination with a mechanism having an electrical power source provided with a power terminal and a common terminal and first and second electrical members each having a connection to said common terminal, an automatic control device adapted to selectively energize said first and second electrical members, comprising a vacuum tube having a plate, a grid and means for accommodating the flow of current through said tube, means connecting said tube with said terminals for energizing said tube, circuit means interconnecting the plate of said tube with said power terminal and with said members to accommodate selective energization of said members in response to the amount of plate current flowing through said tube, a first resistor having one side connected to said power terminal, a light sensitive device connected between the other side of said first resistor and said grid, grid resistor means connected between said grid and said common terminal, and a second resistor connected between said other side of said first resistor and one of said electrical members to accommodate a voltage divider circuit when said last mentioned electrical member is de-energized.

7. The subject matter of claim 5 wherein said circuit means includes a first switch for accommodating the selective operation of said electrical members, and a second switch adapted to disconnect said resistor from said common terminal when a predetermined amount of plate current flows in said tube.

8. In a vehicle comprising a source of electrical energy having a power terminal and a common terminal and having lamp means provided with an upper beam filament and a lower beam filament each having a connection to said common terminal; a device for effecting automatic selective energization of said filaments comprising an electronic valve having an input circuit and an output circuit, means connecting said valve to said power terminal, relay means operably connected to said output circuit, circuit means connecting said power terminal and said upper and lower beam filaments to said relay means to accommodate selective operation of said filaments, light sensitive means operably connected to the input circuit of said valve and operable through said valve to control the operation of said relay means in response to predetermined lighting conditions, and input circuit sensitivity means connected between said input circuit and said relay means for accommodating a more sensitive input circuit when said upper filaments are energized as compared to when said lower filaments are energized.

9. The subject matter of claim 8 wherein said sensitivity means includes a resistor operatable to form a voltage divider network when said upper filament is energized.

10. In a vehicle comprising a source of electrical energy having a power terminal and a common terminal and having lamp means provided with an upper beam filament and a lower beam filament each having a connection to said common terminal; a device for effecting automatic selective energization of said filaments comprising an electronic valve having an input circuit and an output circuit, means connecting said valve to said power terminal, relay means operably connected to said output circuit, circuit means connecting said power terminal and said upper and lower beam filaments to said relay means to accommodate selective operation of said filaments, light sensitive means operably connected to the input circuit of said valve and operable through said valve to control the operation of said relay means in response to predetermined lighting conditions, and bypass means operably connected between said input circuit and said relay means and having a relatively small electrical resistance in response to the passage of current in one direction as compared to the passage of current in the opposite direction, said bypass means accommodating a low resistance path from said input circuit to said common terminal when said lower filament is energized.

11. The subject matter of claim 10 wherein said bypass means includes a selenium rectifier.

12. In a vehicle comprising a source of electrical energy having a power terminal and a common terminal and having lamp means provided with an upper beam filament and a lower beam filament each having a connection to said common terminal; a device for effecting automatic selective energization of said filaments comprising an electronic valve having an input circuit and an output circuit, means connecting said valve to said power terminal, relay means operably connected to said output circuit, circuit means connecting said power terminal and said upper and lower beam filaments to said relay means to accommodate selective operation of said filaments, light sensitive means operably connected to the input circuit of said valve and operable through said valve to control the operation of said relay means in response to predetermined lighting conditions, input circuit sensitivity means connected between said input circuit and said relay means for accommodating a more sensitive input circuit when said upper filaments are energized as compared to when said lower filaments are energized, and bypass means operably connected between said input circuit and said relay means and having a relatively small electrical resistance in response to the passage of current in one direction as compared to the passage of current in the opposite direction, said bypass means accommodating a low resistance path from said input circuit to said common terminal when said lower filament is energized.

13. In a vehicle comprising a source of electrical energy having a power terminal and a common terminal and having lamp means provided with an upper beam filament and a lower beam filament each having a connection to said common terminal; a device for effecting automatic selective energization of said filaments comprising an electronic valve having an input circuit and an output circuit, means connecting said valve to said power terminal, first relay means including contacts and a coil connected in said output circuit, a second relay having a coil, fixed contacts connected to said filaments and a movable contact connected to said power terminal, circuit means interconnecting said second relay coil, said power terminal and one of said first relay contacts, said last mentioned circuit means including a switch, parallel connecting means interconnected between said switch and said output circuit for accommodating a parallel connection of the coils of said first and second relay means when said switch is actuated, and light sensitive means operably connected to the input circuit of said valve and operable through said valve to control the operation of said relay means in response to predetermined lighting conditions.

14. The subject matter of claim 13 wherein said parallel connecting means includes a diode having first and second resistances depending on the direction of current flow therethrough.

References Cited in the file of this patent

UNITED STATES PATENTS

| | | |
|---|---|---|
| 2,558,969 | Le Croy | July 3, 1951 |
| 2,560,748 | Silva | July 17, 1951 |
| 2,740,902 | Miller | Apr. 3, 1956 |